US012708934B2

(12) United States Patent
Doupe

(10) Patent No.: US 12,708,934 B2
(45) Date of Patent: Aug. 18, 2026

(54) UNDERDRAIN FOR MEDIA VESSEL AND METHOD OF CLEANING

(71) Applicant: BL Technologies, Inc., Minnetonka, MN (US)

(72) Inventor: Michael Doupe, Belwood (CA)

(73) Assignee: BL TECHNOLOGIES, INC., Minnetonka, MN (US)

(*) Notice: Subject to any disclaimer, the term of this patent is extended or adjusted under 35 U.S.C. 154(b) by 135 days.

(21) Appl. No.: 18/695,704

(22) PCT Filed: Oct. 4, 2022

(86) PCT No.: PCT/US2022/045699
§ 371 (c)(1),
(2) Date: Mar. 26, 2024

(87) PCT Pub. No.: WO2023/059659
PCT Pub. Date: Apr. 13, 2023

(65) Prior Publication Data

US 2024/0416396 A1 Dec. 19, 2024

Related U.S. Application Data

(60) Provisional application No. 63/253,863, filed on Oct. 8, 2021.

(51) Int. Cl.
*B08B 9/027* (2006.01)
*C02F 1/00* (2023.01)
(Continued)

(52) U.S. Cl.
CPC .............. *B08B 9/027* (2013.01); *C02F 1/006* (2013.01); *F16L 9/22* (2013.01);
(Continued)

(58) Field of Classification Search
CPC ... B08B 9/027; B08B 2209/027; C02F 1/006; C02F 1/283; C02F 1/42; C02F 2201/004; C02F 2303/14; F16L 9/22
See application file for complete search history.

(56) References Cited

U.S. PATENT DOCUMENTS 2,647,636 A * 8/1953 Rafferty ............... B01D 35/023 210/446
3,291,311 A * 12/1966 Pratt ...................... B01D 24/14 210/497.1
(Continued)

FOREIGN PATENT DOCUMENTS

WO 2016046834 A1 3/2016

OTHER PUBLICATIONS

International Application No. PCT/US2022/045699, International Search Report and Written Opinion dated Jan. 26, 2023.
(Continued)

*Primary Examiner* — Sharidan Carrillo

(57) ABSTRACT

An underdrain system for a media pressure vessel has a set of removable pipe sections located between an external header and the bottom of a vessel. Septa extend upwards from the removable pipe sections into the vessel. The header is attached to the bottoms of the removable pipe sections. Each pipe section, and its associated septum, may be removed individually. To clean the vessel, after media is removed from the vessel the pipe sections are removed sequentially while the header remains otherwise attached to the vessel. While a pipe section is removed, its associated septum is removed so that solids can be removed from the annulus between the septum and the vessel. In this way, media can be cleaned from the annuli without moving the external header or entering the vessel.

11 Claims, 11 Drawing Sheets

(51) Int. Cl.
*F16L 9/22* (2006.01)
*C02F 1/28* (2023.01)
*C02F 1/42* (2023.01)

(52) U.S. Cl.
CPC ......... *B08B 2209/027* (2013.01); *C02F 1/283* (2013.01); *C02F 1/42* (2013.01); *C02F 2201/004* (2013.01); *C02F 2303/14* (2013.01)

(56) References Cited

U.S. PATENT DOCUMENTS

| | | | | |
|---|---|---|---|---|
| 3,779,387 | A * | 12/1973 | Day | B01D 24/4631 210/279 |
| 6,093,329 | A * | 7/2000 | McDougald | B01D 24/4636 210/275 |
| 10,981,802 | B2 | 4/2021 | Craw et al. | |
| 2024/0002253 | A1 * | 1/2024 | Craw | C02F 1/004 |
| 2024/0399428 | A1 * | 12/2024 | Doupe | C02F 1/004 |
| 2024/0416396 | A1 * | 12/2024 | Doupe | B01J 3/04 |

OTHER PUBLICATIONS

International Application No. PCT/US2022/045699, International Preliminary Report on Patentability dated Apr. 9, 2024.

* cited by examiner

UNDERDRAIN FOR MEDIA VESSEL AND METHOD OF CLEANING

RELATED APPLICATIONS

This application is a National Stage Entry of International Application No. PCT/US2022/045699, filed Oct. 4, 2022, which claims the benefit of, and priority to, U.S. Patent Application Ser. No. 63/253,863, filed Oct. 8, 2021, which is incorporated herein by reference.

FIELD

This specification relates to media vessels, as used for example for water treatment, and to methods of cleaning them.

BACKGROUND

Some water treatment methods involve flowing the water to be treated through a media bed. The medium used in the bed may be, for example, a filtration material, an adsorptive material, or an ion exchange material. In some methods, the media is contained in a pressure vessel. The vessel is often made of steel and supported on the ground through a set of legs. Many vessels are rated for a pressure of 125 psi at 150° F. (860 kPa at 65° C.), although other ratings are possible. Water typically enters the top of the vessel and flows downwards through the media. Treated water is collected in an underdrain system located in the bottom of the vessel.

A false-bottom underdrain system has many (i.e. 80 to 300) intake nozzles mounted on a false-bottom cone or flat plate welded to the inside circumference of the vessel. When the nozzles or the cone require maintenance, a person must enter the vessel to perform the maintenance. This requires following various safety procedures for confined-space entry (CSE).

Alternatively, an external header underdrain system may be used. The external header is located below and outside of the pressure vessel. Several (i.e. 8) septa (alternatively called strainers or screens) extend upwards into the vessel. The septa are in fluid communication with ports that extend downwards from the bottom of the vessel. The header is connected to the bottom of the ports. When in use, the header collects treated water flowing through the septa and the ports. When the septa require maintenance, the external header is unbolted and lowered away from the bottom of the vessel or a confined-space entry is made to access the septa from inside the vessel. A pressure vessel with an external header underdrain system is shown, for example, in U.S. Pat. No. 10,981,802, entitled Water Treatment Systems and Methods of Treating Water.

As water passes through the media, its ability to treat the water deteriorates. In particular, adsorptive media such as granular activated carbon (GAC) becomes saturated/exhausted and is no longer able to absorb contaminants in the water. Ion exchange materials, typically in the form of resin beads, have a limited number of ions that can be exchanged. In some cases, a medium may be recharged for a limited number of times while in the vessel, but the media eventually needs to be removed from the vessel in order to recharge or replace the media. For this purpose, a media outlet is provided at the bottom of the vessel and a media fill port is provided near the top of the vessel. Water added to the tank can fluidize the media allowing it to flow as slurry from the vessel. Similarly, new media may be added as slurry into the vessel through the media fill port.

INTRODUCTION

The following discussion is intended to introduce the reader to the invention and the detailed description of embodiments to follow, but not to limit or define any claimed invention.

The process of replacing media from a pressure vessel, which may occur every 1-3 months, leaves trace amounts of exhausted media or other contaminated solids lodged in areas around vessel underdrain components. In particular, in external header underdrain systems there is an annulus between the inside of each port and its associated septum where spent media can become trapped. Although the volume of this annulus is small, when treating water to very low concentrations, enough exhausted media can be retained in these areas to cause water filtered after the media change to fail to meet treatment standards. For example, when treating water to remove poly- and per-fluoroalkyl substances (PFAS) the treated water must meet standards specified in parts per trillion or nanograms per liter. When using an ion exchange medium, almost every single resin bead needs to be removed from the vessel with each media replacement. If the water fails to meet treatment standards, the media must be replaced again at a cost of tens of thousands of dollars in new resin beads for a typical, i.e. 7-12' (2.1-3.7 m) diameter pressure vessel.

Removing media from the annuli of a conventional pressure vessel requires either a confined space entry (CSE) to remove the material from within the vessel, or removal of the septa from outside the vessel. CSE is undesirable since it involves risk of asphyxiation, having a rescue crew on standby, setting up a retrieval apparatus and extra plant personnel. But alternatively, typical commercially available external header underdrain systems are designed for removal of the underdrain system only very infrequently, not to remove the septa with every media replacement. Removing the external header is a significant job requiring multiple people and lifting equipment to support and lower the header and later lift it back into place. Movement of the header may also be complicated by additional pipes near or connected to the header and other restrictions limiting access An underdrain system is described herein having removable pipe sections between an external header and a vessel, such as a pressure vessel for a media bed. Optionally, the tops of the pipe sections are attached to short fittings such as flange pads on the bottom of the vessel. The pipe sections can be removed, for example one by one, without moving the external header. As each pipe section is removed, its associated septum may be removed from the vessel by moving the septum through the space previously occupied by the pipe section. An annulus around the septum can then be cleaned from the outside of the pressure vessel. In this way, the annuli can be cleaned without entering the pressure vessel and without removing the header from the pressure vessel.

This specification describes an underdrain system having a set of removable pipe sections located between an external header and the bottom of a vessel. The tops of the removable pipe sections, optionally called spools herein, are attached to the bottom of the vessel. Optionally, short fittings such as flange pads may be attached to the bottom of the vessel for attaching the tops of the pipe sections. Optionally, the tops of the pipe sections may be located within 5 cm of, or even above, the bottom of the vessel. Septa extend upwards into the vessel and are in fluid communication with the pipe sections. The header is attached to the bottoms of the removable pipe sections. Optionally, the header is also attached to the bottom of the vessel independently of the removable pipe sections. Connections between the vessel, the septa, the removable pipe sections and the header are configured such that each pipe section may be removed, optionally without removing other pipe sections, for example by moving a pipe section horizontally. These elements are further configured such that a septum may be removed from the vessel when its associated pipe section has been removed from the vessel and the header. In some examples, the removable pipe sections are vertical and attachments between the removable pipe sections and the tank and header are made by way of horizontal flanges. In some examples a septa has a flange inserted between an upper flange of a pipe section and a flange attached to the vessel. In some examples, each removable pipe section is longer than its associated septa. In some examples, a removable pipe section includes or is connected to a flexible section.

This specification describes a method of cleaning a media vessel. Media is removed from the vessel through a media drain. One or more pipe sections are removed from between an external header and the vessel while the header remains otherwise attached to the vessel. One or more septa associated with the removed pipe sections are removed from the vessel. Additional solids, for example in annuli around the one or more septa, are removed from the vessel. The removed septa and pipe sections are replaced. Optionally, one or more pipe sections that remain attached to the vessel or independent attachments support the header while one or more other pipe sections are removed from the header and the vessel.

The system and method described herein allow the septa to be removed without lowering the header. In some examples, a pipe section is small enough to be handled by a single person without lifting or jacking equipment. The header may remain attached to the vessel throughout the cleaning procedure, and other outlet pipes attached to the header do not need to be disturbed.

DETAILED DESCRIPTION

Figure 1:
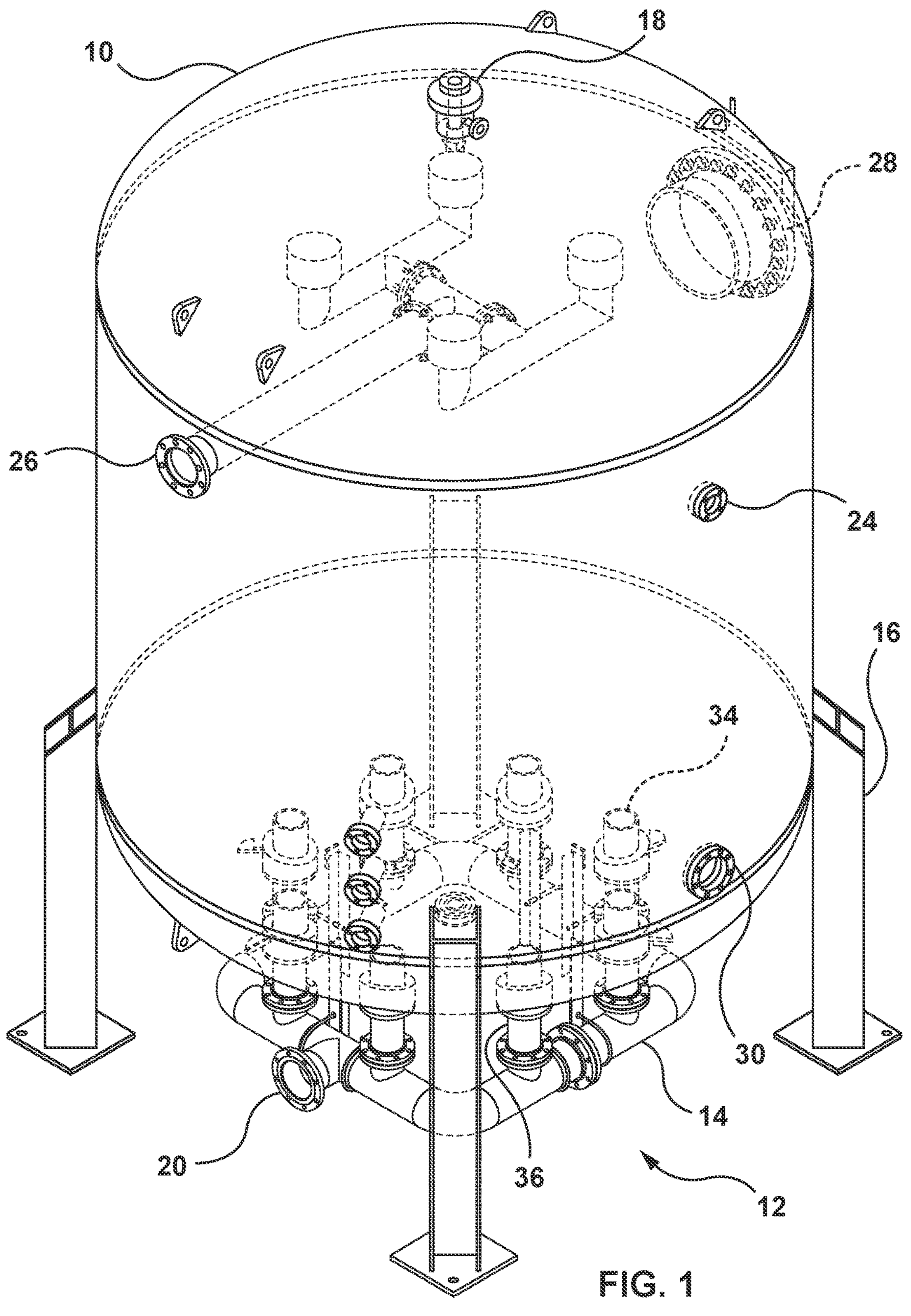
FIG. 1 is an isometric view of a pressure vessel for water treatment using a media bed with an external header underdrain system.

A detailed description of one or more examples or embodiments will be described below to assist in describing the invention and to further enable the reader to make and use the invention. In this detailed description, the invention will be described as used with an otherwise conventional pressure vessel of the type used to hold a water treatment media, for example granular activated carbon or ion exchange resin beads. However, the invention may be applied to other water treatment equipment having a drain system near the bottom of the vessel. A particular example or embodiment might not be within every claimed invention.

A conventional pressure vessel with an underdrain system including an external header has a number, for example 8, of ports attached (i.e. welded) to the bottom of the tank. The ports may be located in a circle around a central media outlet, which is used to remove media from the vessel. The ports are typically made of a section of pipe about 6-12" (15-30 cm) long. A flange is welded on one end of the port and the other end of the port is welded to the tank. Septa in fluid communication with the ports extend upwards into the tank. An external ring header is then attached (i.e. bolted) to flanges of the ports.

In a vessel described herein, removable pipe sections are added between the vessel and the ring header. These pipe sections (optionally called spools in some examples) facilitate removal of the septa for cleaning or inspection, or for cleaning of the annuli around them, without the need to remove the ring header. The pipe sections may be, for example, 6-18" (15-45 cm) long. This may improve one or more of the speed, ease, and safety of cleaning the septa or annuli during maintenance or when replacing the media in the vessel. In some examples the removable pipe sections are rigid assemblies. For example a removable pipe section may be made up of a length of steel pipe with flanges welded onto each end of it. In other examples, a removable pipe section may be made in the form of a flexible connector or include a rigid section and one or more flexible connectors. A flexible connector, alternatively called an expansion joint, includes a flexible section that allows for an axial misalignment between an upper end and a lower end of the flexible connector, or an axial expansion of the flexible connector, or both. When the removable pipe sections include a flexible section, independent attachments may be added between the header and the vessel.

Optionally, the ports of a conventional vessel are also replaced with tangential flange pads (alternatively called flange pads or studding outlets). Alternatively, short ports may be used but the flange pads are typically the shortest form of fitting to a curved vessel bottom having a flange available. A flange pad may have a length, measured on its longest side, of 4" (10 cm) or less. The bottom of the flange pad, or a short port or other fitting attached to the vessel, may be less than 5 cm below the lowest point, excluding any attached fittings, of the bottom of the vessel (typically found at the center of the bottom of the vessel), and optionally may be above the lowest point, excluding any attached fittings, of the bottom of the vessel. The top of the flange pad may be welded over a hole in the vessel. The bottom of the flange pad has a set of threaded holes. A septum with a flange on its lower end is inserted into the vessel through the flange pad. A removable pipe section is then bolted to the flange pad by way of a flange on the top of the pipe section. The flange of the septum is secured between the flange of the pipe section and the flange pad. The use of flange pads, or other short flanges, reduces the height of the vessel directly, and also by way of reducing the length of the septa which in turn allows the removable pipe sections to be short. However, conventional ports could alternatively be used, for example because they are readily available to the manufacture or already fitted to an existing vessel that is being adapted for use with the removable pipe sections. When using conventional ports, the vessel legs may need to be lengthened. Optionally, if conventional ports are used, they may be modified or originally fabricated to be not more than 20 cm long.

Optionally, the flange pad may have one or more ports through its sidewall. A port may be drilled through the flange pad and tapped to receive a pipe fitting. The port may be used to flush or drain an annulus between the septa and the flange before or without removing the septum. In this way, removal of the septum to clean the annulus may be delayed or avoided.

The ring header is attached to the bottom of the removable pipe sections, for example by way of horizontal flanges. Unbolting a pipe section from the flange pad and a flange on the ring header allows the pipe section to be removed by sliding it sideways. The septum can then be pulled downwards into the space previously occupied by the pipe sections. This allows an annulus between the septum and the flange pad to be cleaned from outside of the vessel. Optionally, the septum may be shorter than the pipe section. The septum can then be moved sideways to completely remove it from the tank to allow for better access to the annulus or to clean, inspect or replace the septum.

While one or more pipe sections are removed, the ring header remains attached to the vessel by other pipe sections that have not been removed, by optional independent attachment members, such as struts or U-bolts, between the ring header and the vessel, or both. One, or more than one, pipe section can be removed at a time. Optionally, flexible connectors, for example of the type having a flexible section between two flanges, may be inserted between the removable pipe sections and the header or the vessel or both the header and the vessel. In some examples, the flexible connectors may be METRASPHERE™ flexible connectors sold by Metraflex Quality Products. One or more flexible connectors may be removed with a rigid removable pipe section (and be considered part of the removable pipe section) or remain attached to the header or the vessel. In another option, the entire removable pipe section might be made of a flexible section, made for example of reinforced rubber, with flanges, made for example of plate steel, attached to each end of the flexible section. When removable pipe sections with one or more flexible sections that are part of or attached to the removable pipe section are used it is preferable, though optional, to have independent attachments between the header and the vessel. However, if independent attachments are not provided it is preferable, through optional, to use rigid removable pipe sections and leave a second set of at least three pipe sections connected to the vessel while a first set of pipe sections are removed. After the first set of pipe sections are reconnected to the ring header and the vessel, the second set of pipe sections can be removed to clean their associated annuli.

Figure 2:
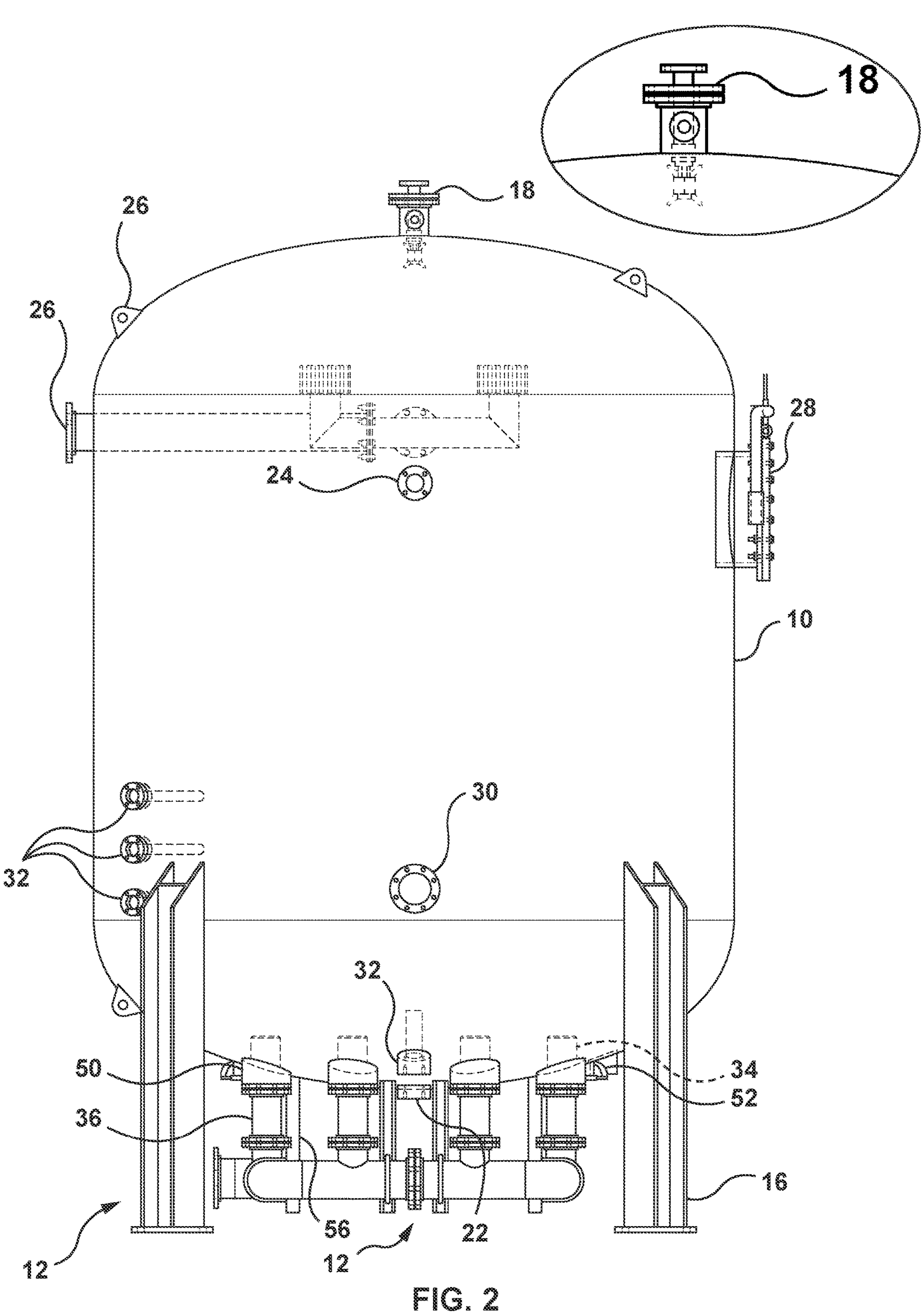
FIG. 2 is a side view of the pressure vessel of FIG. 1.
Figure 3:
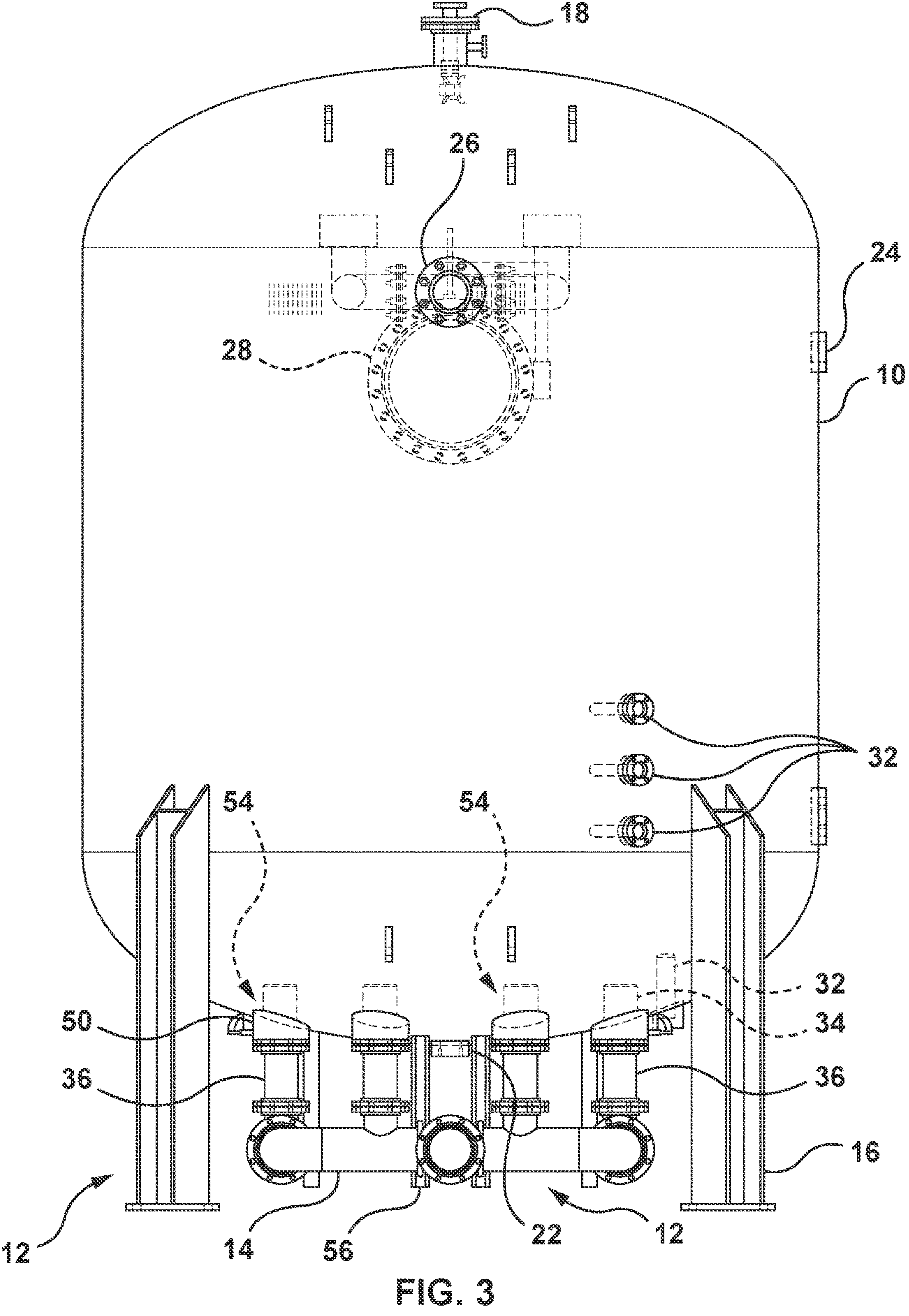
FIG. 3 is a front view of the pressure vessel of FIG. 1.

FIGS. 1-3 shows an example of a vessel 10 with an underdrain system 12. The vessel 10 in this example is a pressure vessel for holding a water treatment media such as granular activated carbon or ion exchange resin beads. The underdrain system includes a header 14 that is external to the vessel 10. In the example shown, the vessel 10 has a diameter of about 12' (3.7 m).

The vessel 10 has a set of legs 16 to support the vessel 10 on a floor. The vessel 10 also has a wash nozzle 18 and a flanged media outlet port 22. During media changes, media is removed through the outlet port 22 while water is added through the wash nozzle 18. A media inlet port 24 is used to add new media to the vessel 10. A hatch 28 allows a person to enter the vessel 10 when necessary. A sight glass 30 is provided to allow a person to see into the vessel 10. A set of anticipatory probes 32 are provided at different elevations to allow for monitoring the condition of the media.

During use, water to be treated enters the vessel through an inlet distributor nozzle 26. The water flows through the media in the vessel, septa 34, and spools 36 to the header 14. The header 14 is in the shape of a ring with a flanged outlet port 20.

Figure 4:
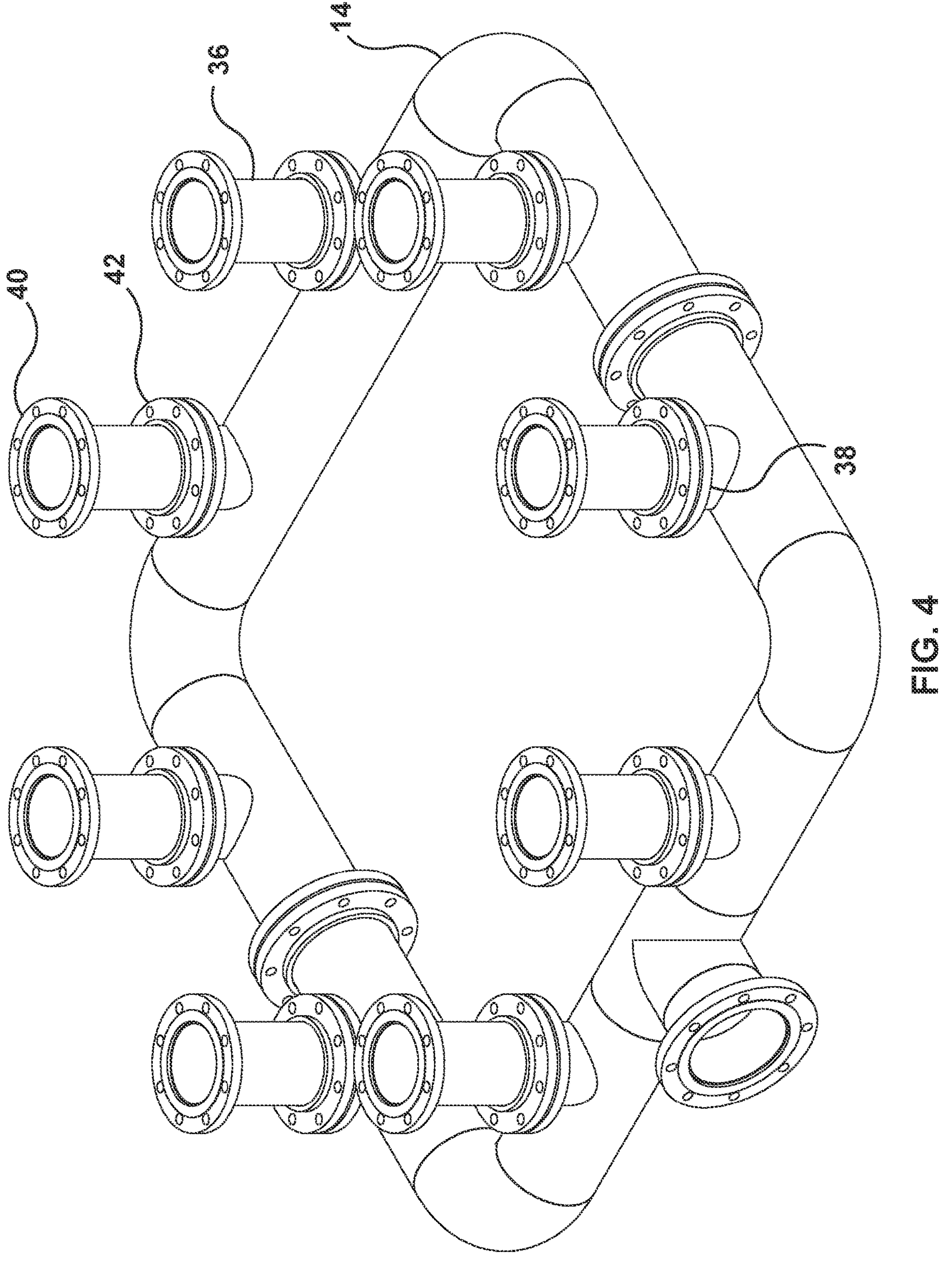
FIG. 4 is an isometric view of a header and spools (i.e. removable pipe sections) of the underdrain system of FIG. 1.
Figure 5:
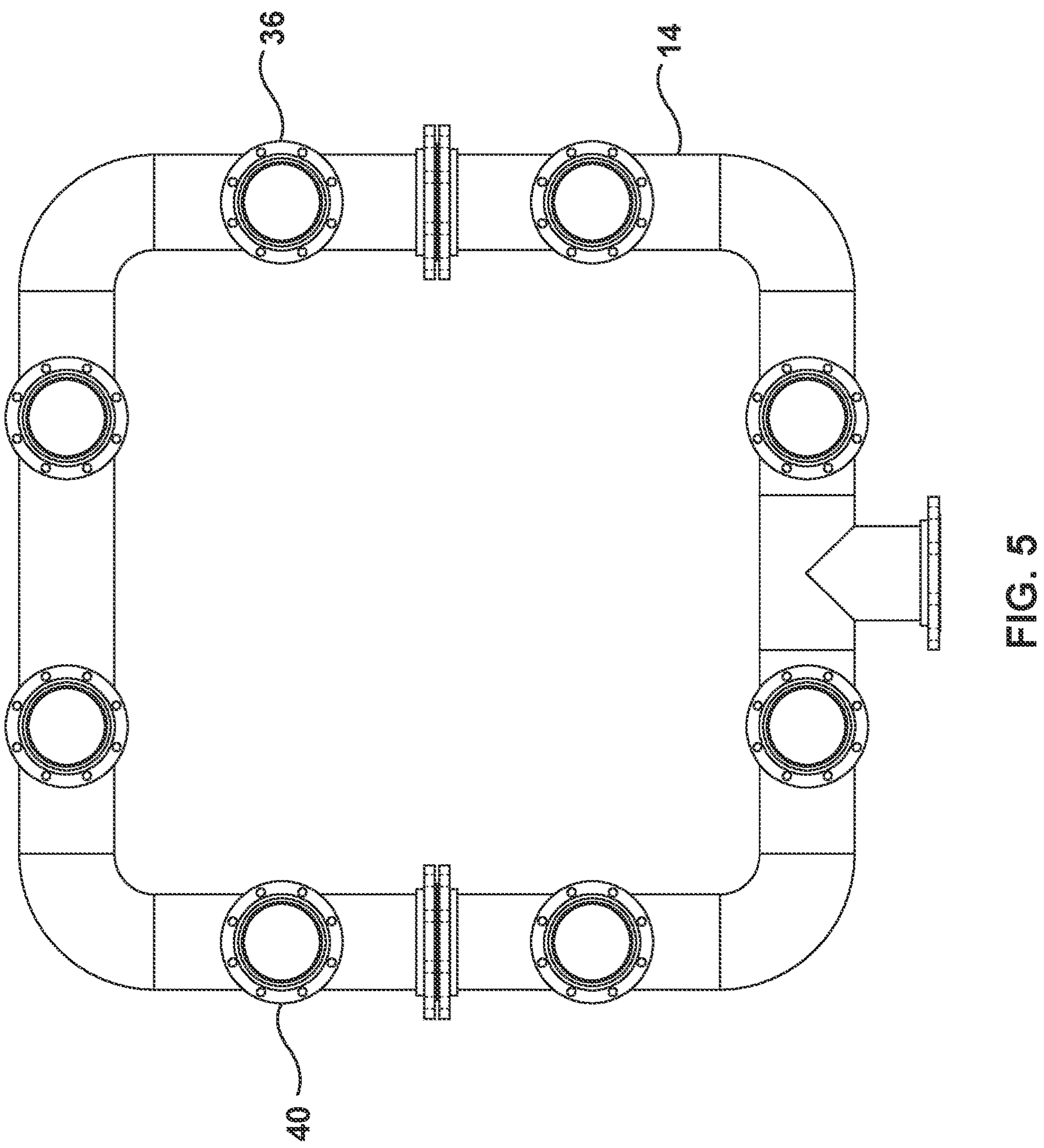
FIG. 5 is a top view of the header and spools of FIG. 4.
Figure 6:
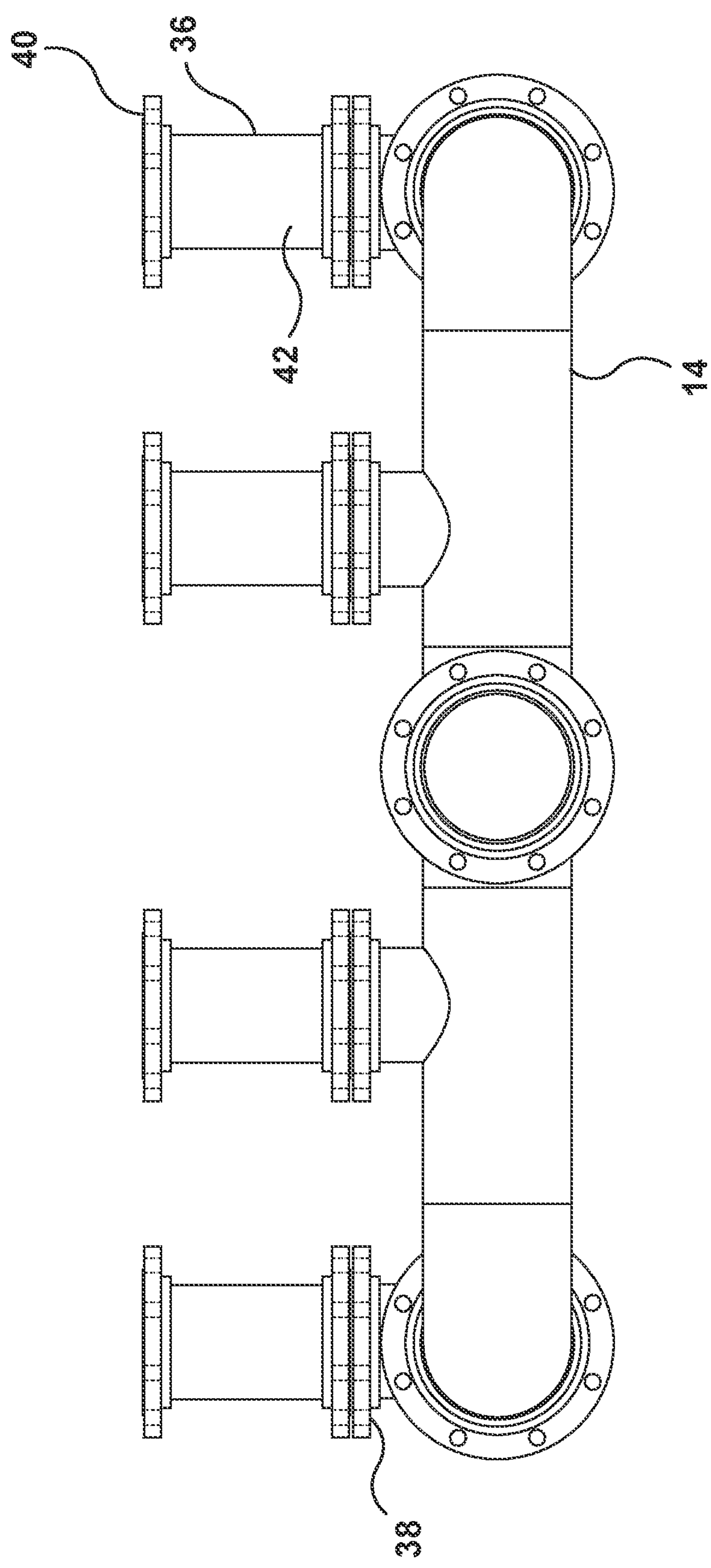
FIG. 6 is a side view of the header and spools of FIG. 5.

FIGS. 4-6 show the header 14 and spools 36 in greater detail. In the example shown, the header 14 is made up of sections of 8" (20 cm) diameter pipe bolted together. The header 14 has a set of inlet flanges 38. The inlet flanges 38 are located at the top of the header 14 and oriented horizontally. Each spool 36 is a section of pipe with an upper flange 40 at the top of the spool 36 and a lower flange 42 at the bottom of the spool 36. The upper flange 40 and lower flange 42 are perpendicular to the length of the spool 36. In the example shown, the section of pipe of the spool is about 6" (15 cm) in diameter and 12" (30 cm) long. Bolts and nuts, not shown, attached the spools 36 to the header 14.

Figure 7:
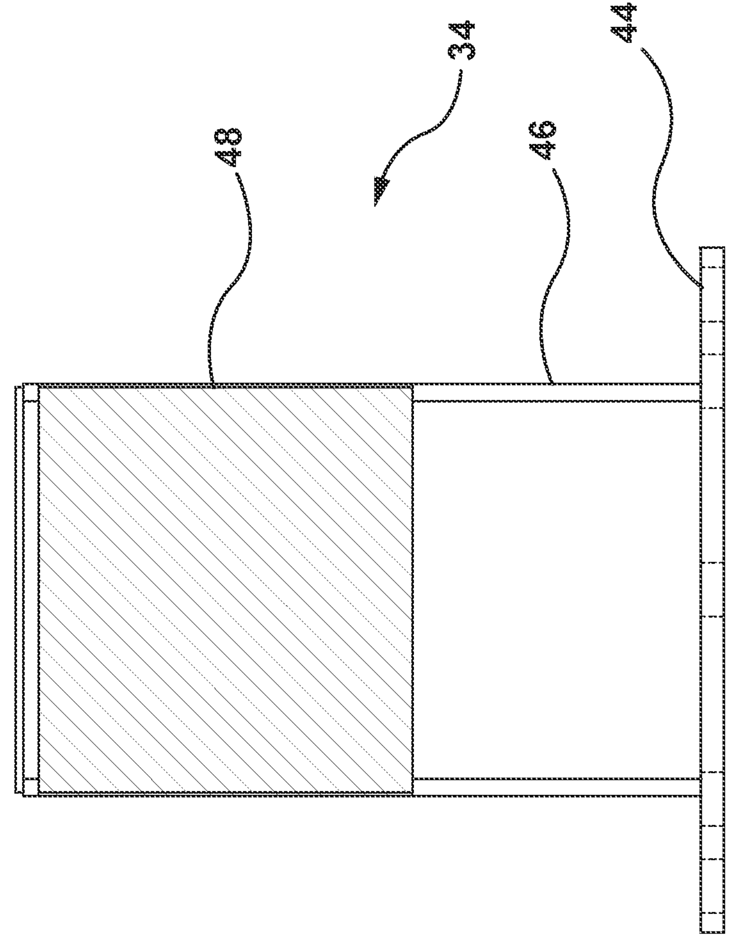
FIG. 7 is a side view of a septum of the underdrain system of FIG. 1.
Figure 8:
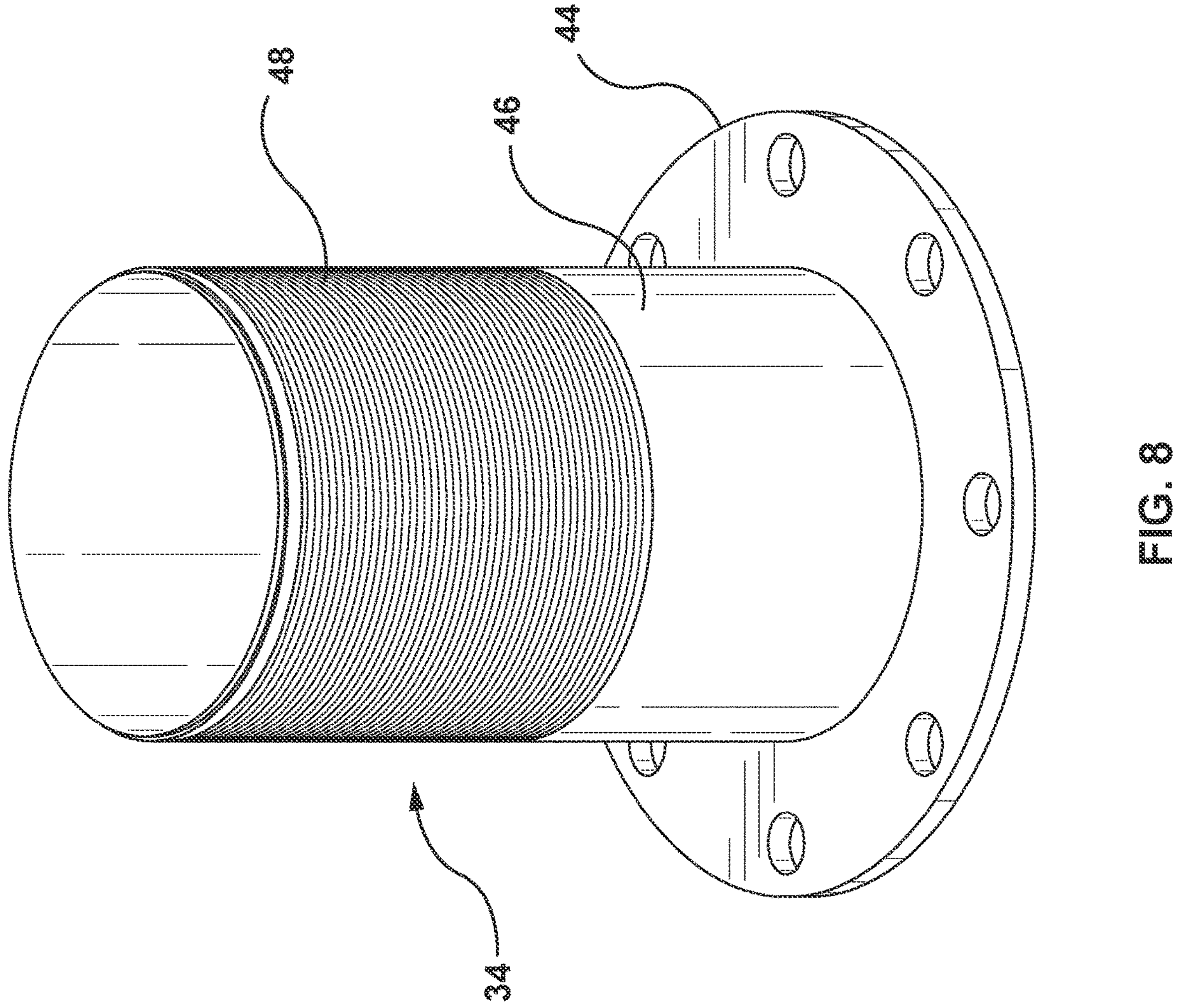
FIG. 8 is an isometric view of the septum of FIG. 7.

FIGS. 7-8 show a septum 34. The septum 34 has a plate flange 44 attached to a solid pipe segment 46. A screen 48, for example a wellscreen, is attached (i.e. welded) to the top of the solid pipe segment 46. The screen 48 may be made, for example, of stainless steel v-wire or other well screen material.

Figure 9:
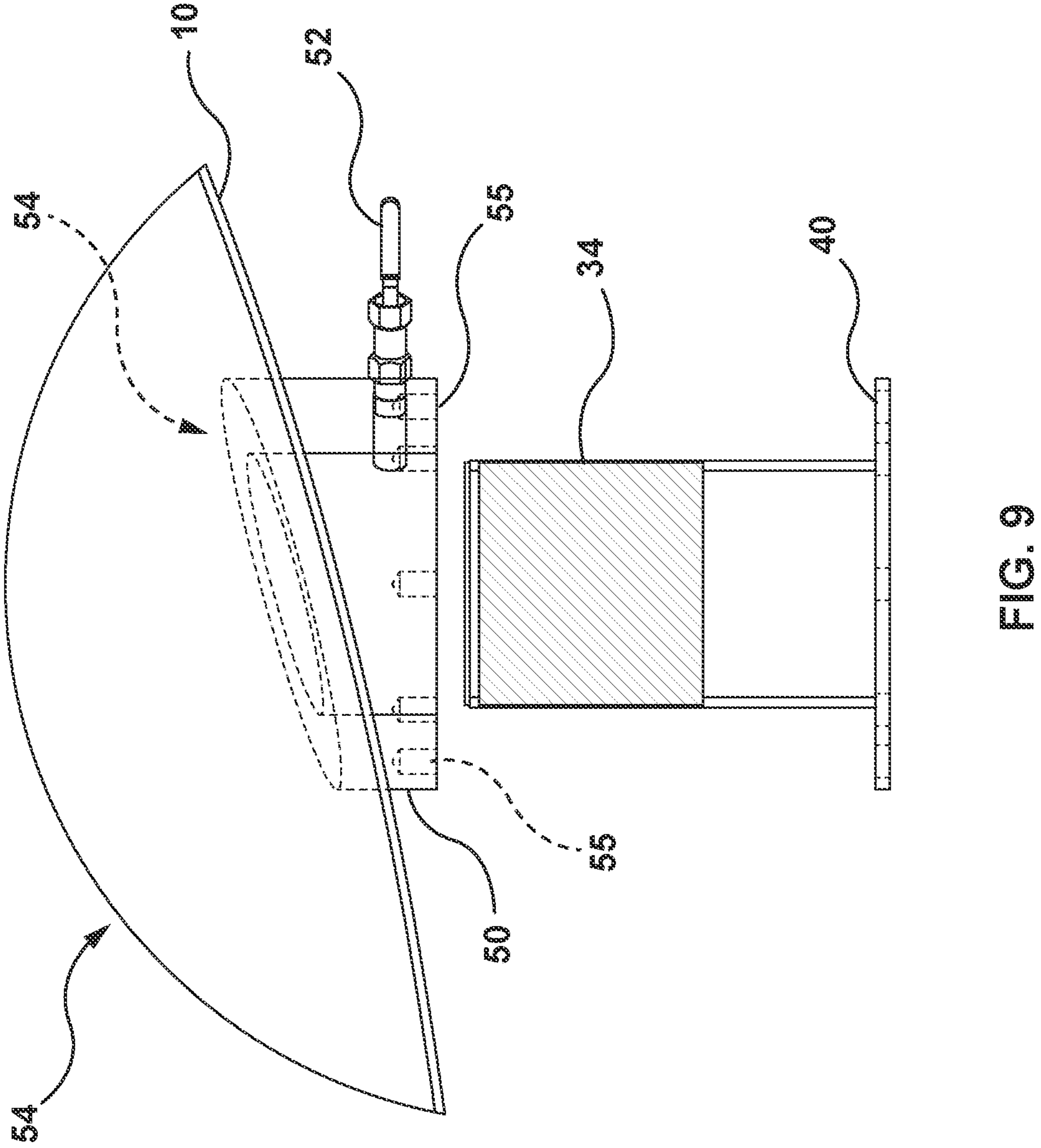
FIG. 9 is an enlarged view of part of the vessel of FIG. 1 showing a flange pad and spool removed from the flange pad.

FIG. 9 shows one of a set of tangential flange pads 50 attached to the bottom of the vessel. The flange pad 50 presents a horizontal flange surface. The flange pad 50 has threaded holes 55 to accept bolts (not shown) passing through the upper flange 40 of the spool and the plate flange 44 of the septum 34. The septum 34, when inserted into the flange pad 50, extends upwards from its flange 44 into the vessel 10. Optionally, one or more ports 52 are provided through the side wall of the flange pad 50. The ports 52 may be connected to pipes and used to spray water into an annulus 54 between the flange pad 50 and the septum 34, or to withdraw a slurry from the annulus 54.

Figure 10:
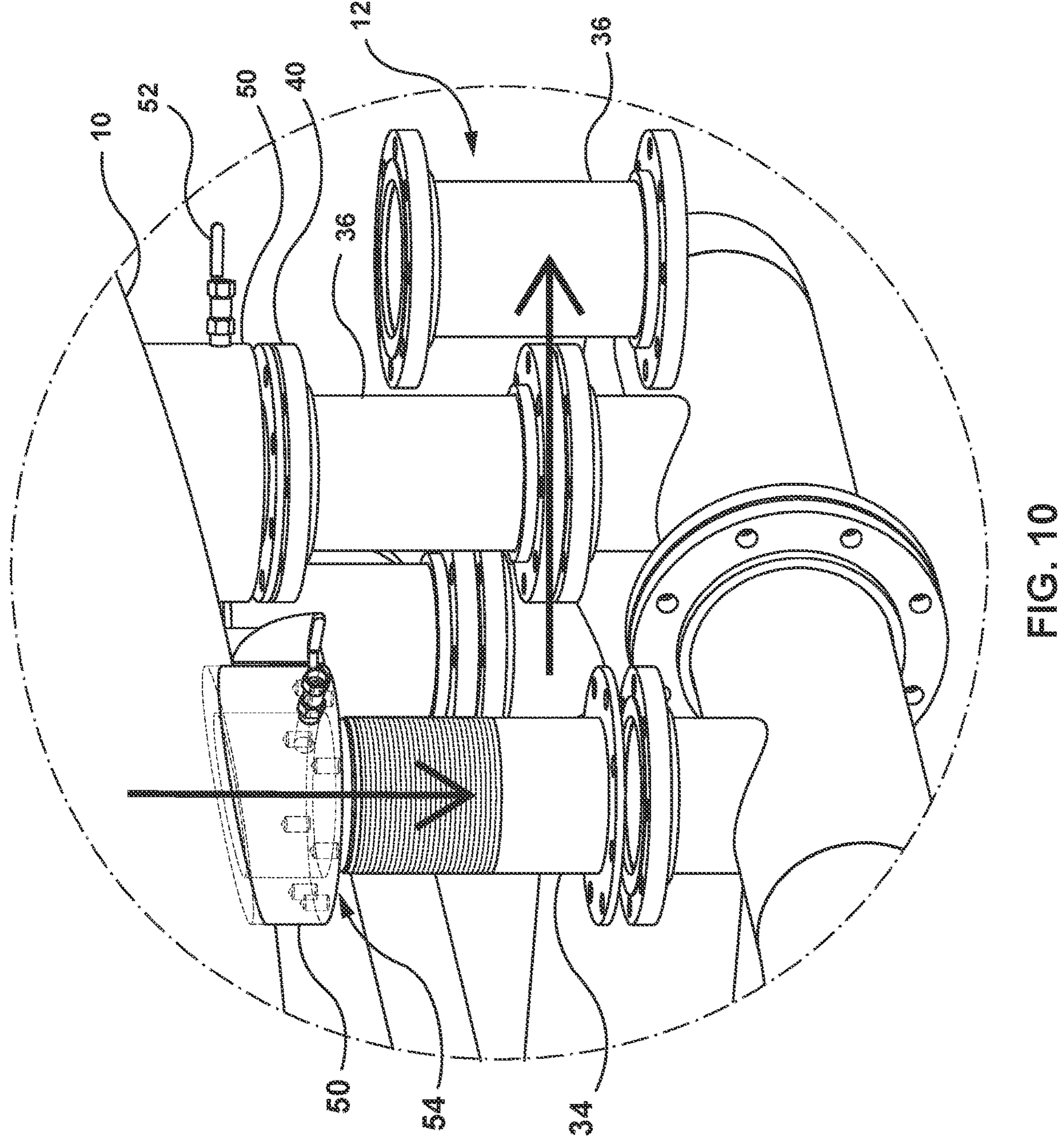
FIG. 10 shows steps in cleaning a vessel of FIG. 1.

FIG. 10 shows steps in cleaning the vessel 10. A spool 36 is unbolted from the flange pad 50 and the header 14 and moved sideways away from the header 14. The septum 34, which is shorter than the spool 36, is then lowered into the space previously occupied by the spool 36. In this way, the septum 34 is removed from the vessel 10. Optionally, the septum 34 can be moved sideways to better expose the annulus 54 inside the pad flange 50. The annulus 54, or the inside of the pad flange 50 generally, can then be cleaned out. For example, media or other solids are removed from the inside of the pad flange 50. After the annulus 54 is cleaned, the septum 34 is reinstalled in the vessel 10 and the spool 36 is bolted back into place. Another spool 36 and septum 34 can then be removed. The process can be repeated until every spool 36 and septum 34 have been removed and replaced, and all of the annuli 54 are clean.

In the method described above, the header 14 remains attached to the vessel 10 even when a spool 36 is removed. Optionally, additional struts 56 may be added between the header 14 and the vessel to allow more spools 36 to be removed simultaneously. However, keeping 3 or 4 spools 36 attached may be adequate to support the header 14 while other spools 36 are removed. Accordingly, eight annuli 52 can be cleaned in two to four sets if desired. Alternatively, one annulus 52 at a time may be cleaned.

Figure 12:
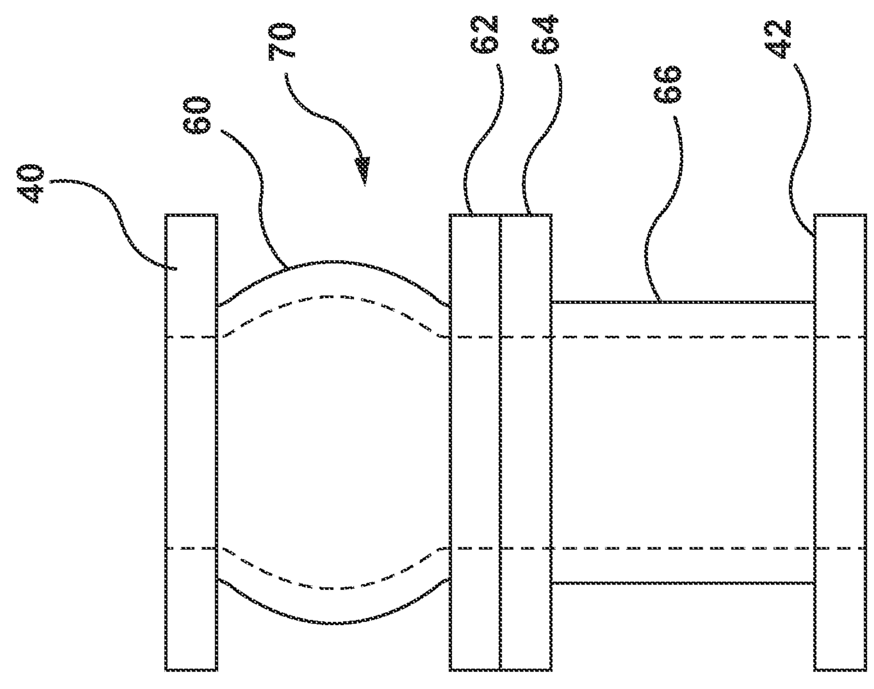
FIG. 12 shows another alternative removable pipe section.
Figure 11:
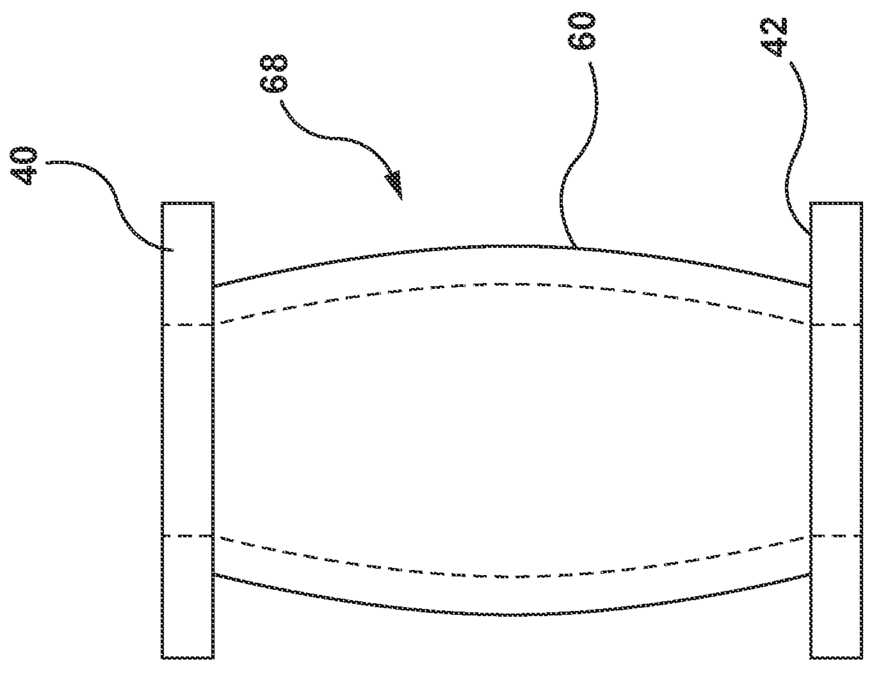
FIG. 11 shows and an alternative removable pipe section.

FIG. 11 shows a first alternative removable pipe section 68, which may be used in place of the spool 36 described above. The first alternative removable pipe section 68 has a flexible section 60 connected to an upper flange 40 and a lower flange 42. FIG. 12 shows a second alternative removable pipe section 70. The second alternative removable pipe section 70 has a flexible section 60 connected to an upper flange 40 and a first intermediate flange 62. The second alternative removable pipe section 70 also has a rigid pipe section 66 connected to a second intermediate flange 62 and a lower flange 42. Alternatively, variations on the second alternative removable pipe section 70 may be made with the flexible section 60 at the bottom of the second alternative removable pipe section 70 or on both the top and bottom of the second alternative removable pipe section 70.

The invention may be practiced in various alternative forms and/or with modifications to the description of examples above. Ordinary methods and devices used to build pipe networks, such as gaskets, sealants, fasteners, fittings etc. have not been described above but may be used as required.

I claim:

1. A method of cleaning a media pressure vessel comprising the steps of, removing one or more pipe sections of a plurality of pipe sections from between an external header and a bottom of the vessel while the header remains attached to the vessel by one or more remaining pipe sections of the plurality of pipe sections, one or more attachment members extending between the header and the bottom of the vessel, or both; and, removing one or more septa of a plurality of septa from the vessel, wherein each removed septum is removed from the vessel by lowering the respective septum into a space previously occupied by a corresponding one of the removed pipe sections; and cleaning the media pressure vessel by removing solids from respective portions of the vessel exposed by said removing the one or more septa from the vessel.

2. The method of claim 1 comprising replacing the removed one or more septa and the removed one or more pipe sections and then removing one or more further pipe sections of the plurality of pipe sections and one or more further septa of the plurality of septa from the vessel.

3. The method of claim 1 wherein the header remains attached to the vessel during said removing the one or more pipe sections by the one or more remaining pipe sections.

4. The method of claim 1 wherein said removing the one or more pipe sections comprises moving the one or more pipe sections sideways away from the header.

5. The method of claim 1 wherein said removing the one or more septa comprises moving each removed septum sideways away from the header after the respective septum is lowered into the space previously occupied by the corresponding removed pipe section.

6. The method of claim 1, wherein each removed septum is shorter than the corresponding removed pipe section.

7. The method of claim 1, wherein the header remains attached to the vessel during said removing the one or more pipe sections by the one or more attachment members.

8. The method of claim 1, each pipe section extends vertically between the header and the bottom of the vessel.

9. The method of claim 1, wherein each pipe section comprises a lower flange removably attachable to a corresponding one of a plurality of inlet flanges of the header.

10. The method of claim 1, wherein each pipe section comprises an upper flange removably attachable to a corresponding one of a plurality of flange pads of the vessel.

11. The method of claim 2, further comprising, after said removing the one or more further septa, removing solids from respective portions of the vessel exposed by removing the one or more further septa from the vessel.

* * * * *